(12) United States Patent
Lapstun

(10) Patent No.: US 8,690,321 B2
(45) Date of Patent: Apr. 8, 2014

(54) FIXATION-BASED CONTROL OF ELECTROACTIVE SPECTACLES

(76) Inventor: Paul Lapstun, Rodd Point (AU)

(*) Notice: Subject to any disclaimer, the term of this patent is extended or adjusted under 35 U.S.C. 154(b) by 0 days.

(21) Appl. No.: 13/452,875

(22) Filed: Apr. 21, 2012

(65) Prior Publication Data
US 2013/0278889 A1 Oct. 24, 2013

(51) Int. Cl.
*G02C 7/04* (2006.01)
*G02C 7/08* (2006.01)
*G02F 1/29* (2006.01)

(52) U.S. Cl.
USPC ............... 351/159.4; 351/159.39; 359/315

(58) Field of Classification Search
USPC ............ 351/159.39, 159.4, 159.76, 206
See application file for complete search history.

(56) References Cited

U.S. PATENT DOCUMENTS

| | | | | |
|---|---|---|---|---|
| 6,099,124 A * | 8/2000 | Hidaji | | 351/202 |
| 6,857,741 B2 * | 2/2005 | Blum et al. | | 351/159.39 |
| 7,023,594 B2 * | 4/2006 | Blum et al. | | 351/159.03 |
| 7,396,126 B2 * | 7/2008 | Blum et al. | | 351/159.42 |
| 2011/0279772 A1 * | 11/2011 | Blum et al. | | 351/168 |
| 2012/0133891 A1 * | 5/2012 | Jiang | | 351/210 |
| 2012/0194781 A1 * | 8/2012 | Agurok | | 351/201 |

* cited by examiner

*Primary Examiner* — Evelyn A. Lester
*Assistant Examiner* — William Alexander

(57) ABSTRACT

A tracking device (6) for controlling the focus of electroactive spectacles (2), the spectacles (2) comprising electroactive lenses (24, 26), the tracking device (6) comprising: a tracking camera (14), a tracking controller (18), and a transmitter (20); wherein the tracking controller (18) is configured to: capture, via the tracking camera (14), an image (16); detect, in the image (16), a pair of eyes; determine, from the image of the eyes, a target focus; and transmit, via the transmitter (20), a focus message (4) to the spectacles (2), the focus message (4) being indicative of the target focus, and instructive to the spectacles (2) to set the focus of the lenses (24, 26) accordingly.

20 Claims, 2 Drawing Sheets

FIXATION-BASED CONTROL OF ELECTROACTIVE SPECTACLES

BACKGROUND ART

Spectacles utilising electroactive lenses are typically used to provide the wearer with two or more selectable focus settings. Refer, for example, to Blum et al, "Optical Lens System with Electro-Active Lens Having Alterably Different Focal Lengths", U.S. Pat. No. 6,619,799, the contents of which are herein incorporated by reference.

While they have myriad uses, electroactive spectacles are particularly useful as an improved replacement for the bifocal spectacles typically worn by presbyopes, since, unlike standard bifocals, they provide the wearer with near and far focus settings that span the full visual field of the spectacles.

Electroactive spectacles include three essential elements: a pair of electroactive lenses, a controller (or pair of controllers) for controlling the lenses, and a mechanism for the wearer to select a focus setting.

Current electroactive spectacles typically provide the user with two mechanisms for selecting focus. The first mechanism allows the user to manually select focus using a button or switch incorporated in the spectacles. The second mechanism automatically infers the user's desire for near focus when the spectacles are tilted forward relative to the horizontal plane, and a desire for far focus otherwise. Neither mechanism is ideal.

When a person with normal vision fixates on a near object their visual system is able to automatically focus on the object without conscious control. Fixation is the only control mechanism required, and thus suggests the ideal for a corresponding mechanism in electroactive spectacles. While it is desirable to implement such a mechanism entirely within the spectacles, as mentioned by Blum et al in aforementioned U.S. Pat. No. 6,619,799, the low weight and slim form-factor desired in modern spectacles makes this difficult.

SUMMARY OF THE INVENTION

In accordance with a first embodiment the present invention provides a tracking device for controlling the focus of electroactive spectacles, the spectacles comprising at least one electroactive lens, the tracking device comprising:
(a) a tracking camera;
(b) a tracking controller; and
(c) a transmitter;
wherein the tracking controller is configured to:
(i) capture, via the tracking camera, an image;
(ii) detect, in the image, a pair of eyes;
(iii) determine, from the image of the eyes, a target focus; and
(iv) transmit, via the transmitter and to the spectacles, a focus message;
the focus message being indicative of the target focus, and instructive to the spectacles to set the focus of the at least one lens accordingly.

Optionally the controller is configured to estimate the vergence of the eyes, and to determine the target focus from the vergence.

Optionally the controller is configured to estimate the gaze direction of the eyes, and to determine the target focus from the gaze direction.

Optionally the controller is configured to estimate the gaze direction relative to the tracking camera.

Optionally the tracking device further comprises a display device.

Optionally the display device is a mobile phone; a smartphone; a digital still camera; a digital video camera; an electronic book reader; a personal digital assistant; a handheld game machine; a tablet computer; a laptop computer; a desktop computer; a computer monitor; or a television.

Optionally the transmitter transmits the focus message to the spectacles directly.

Optionally the transmitter transmits the focus message to the spectacles via a network.

Optionally the network is a personal-area network, a local-area network, a wide-area network, a wired network, a wireless network, or the Internet.

Optionally the controller is further configured to identify the spectacles and transmit the focus message to a network address associated with the spectacles.

Optionally the controller is configured to identify the spectacles by recognizing at least one feature of the spectacles.

Optionally the controller is configured to identify the spectacles by recognizing the face in the image containing the eyes and identifying the spectacles as associated with the face.

Optionally the controller is configured to identify the spectacles by identifying the spectacles as associated with at least one of: an owner of the tracking device; an habitual user of the tracking device; and a logged-in user of the tracking device.

Optionally the controller is further configured to only transmit the focus message if the spectacles are in the vicinity of the tracking device.

In accordance with another embodiment the present invention provides a method for controlling the focus of electroactive spectacles, the spectacles comprising at least one electroactive lens, the method comprising the steps of:
(i) capturing, via a camera, an image;
(ii) detecting, in the image, a pair of eyes;
(iii) estimating, from the image of the eyes, a target focus; and
(iv) transmitting, via a transmitter and to the spectacles, a focus message;
the focus message being indicative of the target focus, and instructive to the spectacles to set the focus of the at least one lens accordingly.

Optionally the method further comprises a step of estimating the vergence of the eyes, and determining the target focus from the vergence.

Optionally the method further comprises a step of estimating the gaze direction of the eyes, and determining the target focus from the gaze direction.

Optionally the method further comprises a step of identifying the spectacles, and transmitting the focus message to a network address associated with the spectacles.

In accordance with another embodiment the present invention provides a system comprising:
(a) electroactive spectacles, the spectacles comprising at least one electroactive lens; and
(b) the tracking device of the first embodiment for controlling the focus of the spectacles;
wherein the spectacles are configured to set the focus of the at least one lens according to the target focus indicated by the focus message transmitted by the tracking device.

Optionally the spectacles further comprise:
(a) a receiver; and
(b) a spectacles controller; the spectacles controller configured to:
(i) receive, via the receiver and from the tracking device, the focus message; and (ii) set the focus of the at least one lens according to the target focus indicated by the focus message.

DRAWINGS

Figures

Figure 1:
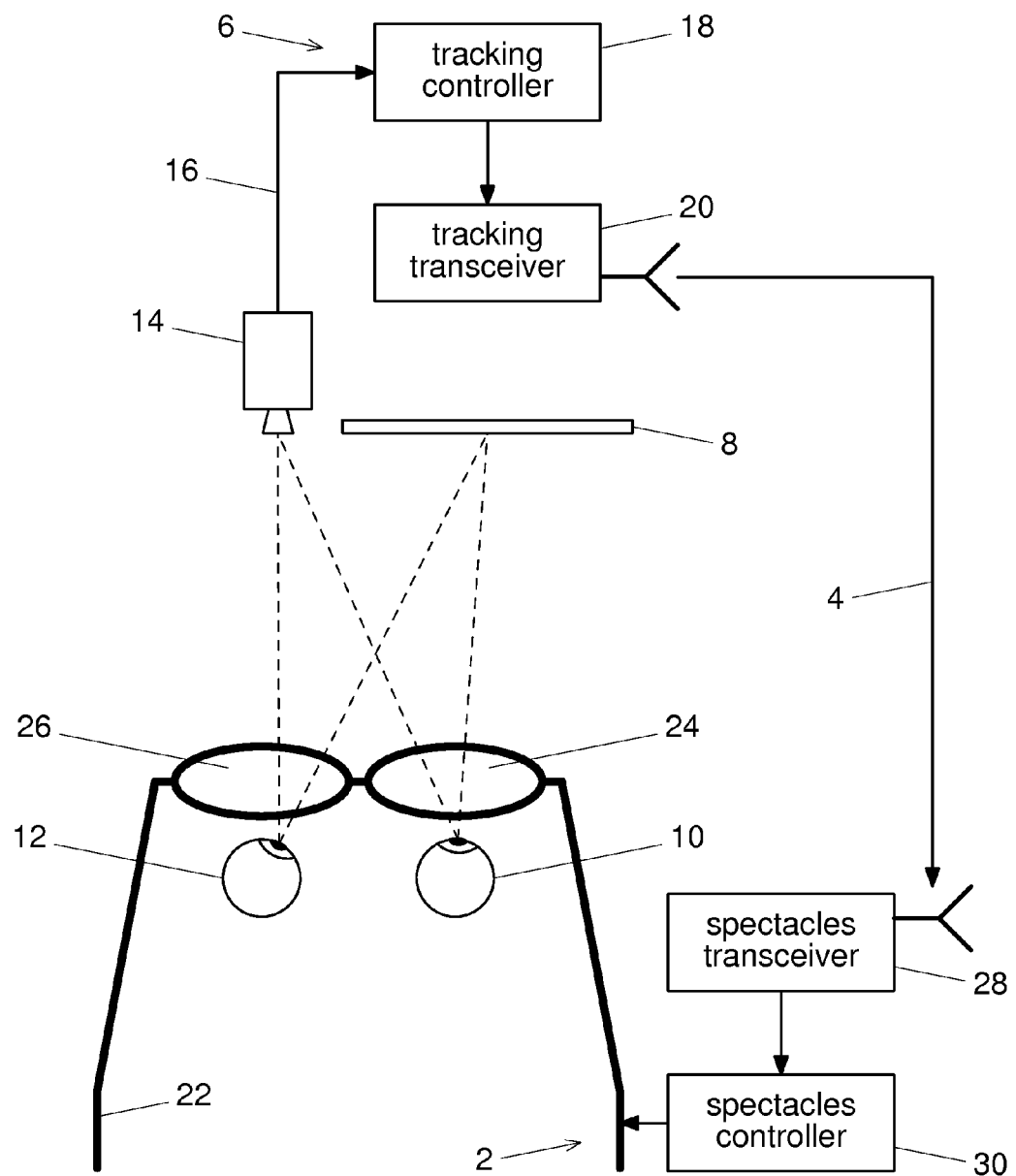
FIG. 1 shows a block diagram of electroactive spectacles responsive to a focus message transmitted by an eye-tracking device coupled to a display.

REFERENCE NUMERALS 2 electroactive spectacles
4 focus message
6 eye-tracking device
8 display
10 right eye
12 left eye
14 camera
16 image
18 tracking controller
20 tracking transceiver
22 spectacles frame
24 spectacles right lens
26 spectacles left lens
28 spectacles transceiver
30 spectacles controller
32 capture image
34 detect face and eyes
36 identify spectacles
38 spectacles database
40 estimate vergence or gaze
42 estimate fixation depth
44 determine target focus
46 transmit focus message

DETAILED DESCRIPTION OF PREFERRED EMBODIMENTS

The user's target of near fixation is increasingly the surface of an electronic device such as a portable or handheld device or a larger desktop device. Common handheld devices include electronic book (e-book) readers, personal digital assistants (PDAs), mobile phones and smartphones, tablets, and game machines. Common desktop devices include laptops, desktop computers, televisions, and the like. In addition, the great majority of a typical user's daily interactions are with a small number of devices personal to the user, such as a personal smartphone and a personal laptop or desktop computer.

In one embodiment of the present invention the electronic device that is the target of near fixation uses a digital camera to determine when the user is gazing at the device, and wirelessly instructs the user's electroactive spectacles to maintain an appropriate near focus mode for the duration of the gaze. This provides the user with an ideal automatic fixation-based focus-control mechanism without burdening the electroactive spectacles themselves with eye-tracking or range-finding components.

Many electronic devices such as smartphones and laptops already incorporate a user-facing camera for video conferencing purposes, and many users have augmented their desktop computers with cameras for the same purpose.

The target device can be configured to know the size and shape of its surface, and the location of its camera relative to its surface, so that it can accurately determine when the user is fixated on its surface. It can be further configured to assume that specific areas adjacent to (or nearby) its surface also require near focus, and to instruct the spectacles accordingly.

Because the camera of the target device typically has a good view of the user's face, it is able to make a good estimate of the range between the device and the spectacles, i.e. based on facial features such as eye separation. This allows it to easily judge when the user requires a near focus setting, and also allows it to communicate more refined focus control instructions to the spectacles should the spectacles support more fine-grained focus control.

The target device and the spectacles may communicate directly via a wired or wireless interface, or indirectly via a private or public network to which both are connected. The devices may, for example, communicate directly via a WPAN (IEEE 802.15) (e.g. Bluetooth, ZigBee, etc.), or indirectly via a WLAN (IEEE 802.11) (e.g. Wi-Fi) or WWAN (e.g. cellular). Apart from utilising radio, a direct wireless interface between the target device and spectacles may utilise an optical (e.g. IrDA) or other electromagnetic interface. The interface may be one-way or two-way. The controller incorporated in the electroactive spectacles must incorporate an appropriate receiver or transceiver. The target device can know the network identity of the spectacles controller from a prior registration or pairing step performed by the user, allowing it to correctly address focus messages to the spectacles, or it may simply broadcast focus messages in such a way that they are only recognised or acted upon by the appropriate spectacles.

When a person fixates on a near object their eyes swivel inwards so that the eyes' optical axes intersect at the fixation point. As an alternative to tracking the user's gaze, then, it is possible to infer the approximate distance to the point of fixation from the degree of vergence, without identifying the point of fixation, and use this as the basis for focus control. This provides another important aspect of the present invention. Vergence-based focus control mediated by the target device has the additional advantage that it allows the user to fixate on passive objects in the vicinity of the target device without the spectacles exiting near-focus mode, i.e. so long as the user's face remains visible to the target device.

User interaction with the target device, such as touch interaction with a smartphone, provides a further indication that the user is fixated on the device. This information can be used to trigger eye tracking, or can be used instead of eye tracking to select a near focus mode. The target device can also be furnished with soft and/or hard buttons to switch between near and far focus modes, or with a general interface for controlling the focus of the user's electroactive spectacles.

Robust and efficient software to detect faces in digital images is well established. Refer, for example, to Jones et al, "Method and System for Object Detection in Digital Images", U.S. Pat. No. 7,099,510, the contents of which are herein incorporated by reference. Multiple face detectors can be trained and used together to cover a wide range of facial poses. For a description of multi-pose face detection, refer to Jones et al, "Fast Multi-View Face Detection", Mitsubishi Electric Research Laboratories TR2003-96, the contents of which are herein incorporated by reference. Face detection based on the techniques of Jones et al is included in OpenCV, the Open Source Computer Vision Library. Face detection functionality is also now included in popular smartphone SDKs, including for the Google Android and Apple iOS smartphone and tablet operating systems.

Eye detection is typically intrinsic to face detection, and detection is easily extended to other useful features of the face and eyes, such as the eyebrows, nose, mouth, scleras, irises and pupils. For a description of mouth detection, refer to Lienhart et al, "A Detector Tree of Boosted Classifiers for Real-Time Object detection and Tracking", Proceedings of the 2003 International Conference on Multimedia and Expo—Volume 1, the contents of which are herein incorporated by reference. For a description of sclera detection, refer to Betke et al, "Active Detection of Eye Scleras in Real Time", IEEE CVPR Workshop on Human Modeling, Analysis and Synthesis, 2000, the contents of which are herein incorporated by reference.

Vergence can be inferred from the location of the dark irises relative to their surrounding light-colored scleras. Gaze direction can be inferred from the location of the irises relative to the scleras and to the overall orientation of the face. In addition, if the camera is augmented with a (typically near-infrared) light source, then gaze estimation can be based on detecting the difference between the iris positions and the positions of the specular reflections of the light source on the corneas. Refer, for example, to Chapter 5 ("Eye Tracking Techniques") in Duchowski, Eye Tracking Methodology—Theory and Practice, Second Edition, Springer 2007, the contents of which are herein incorporated by reference.

The gaze condition that is easiest to detect is obtained when the user is fixated on the target device or a nearby object above or below the target device. In this case the image of the face is symmetric (e.g. the eyes are located symmetrically with respect to the nose or mouth), the eyes are approximate mirror images of each other, and the dark irises of the eyes are displaced inwards towards the nose relative to their surrounding lighter-colored scleras. As a useful minimum then, the detection of this gaze condition is sufficient to select a close focus setting, and its absence the selection of a far focus setting. For a description of the use of symmetry between the eyes to estimate gaze direction, refer to Magee et al, "A Human—Computer Interface Using Symmetry Between Eyes to Detect Gaze Direction", IEEE Transactions on Systems, Man, and Cybernetics—Part A: Systems and Humans, 38(6), 2008, the contents of which are herein incorporated by reference.

The target device can operate in a mode where it will only send focus messages to spectacles that it recognizes. Recognition can be based on the spectacles themselves. For example, the spectacles may carry a barcode that the device decodes, or they may broadcast an identification signal (e.g. using an IR LED). Alternatively, recognition can be based on recognizing the user's face. Robust and efficient software to recognize faces in digital images is well established. Refer, for example, to Hua et al, "Face Recognition Using Discriminatively Trained Orthogonal Tensor Projections", U.S. Pat. No. 7,936,906, and Turk et al, "Face Recognition System", U.S. Pat. No. 5,164,992, the contents of both of which are herein incorporated by reference.

The target device may recognise any number of users in its field of view and communicate with their respective spectacles. It may, for example, rely on the contents of a network-accessible database of faces and spectacles.

Alternatively, the target device can operate in a mode where it will always send focus messages to the spectacles of a particular known user, such as the owner, habitual user or logged-in user of the device. This may be further subject to that user's spectacles being known to be in the vicinity of the device, e.g. as determined by the establishment of a short-range wireless communications connection between the device and the spectacles, or by comparing the location of the device with the location of the spectacles, with both locations determined in any of a variety of usual ways (e.g. pre-specified, GPS, AGPS, Wi-Fi network name lookup, etc.).

It may be advantageous for the target device to utilise a broadcast rather than point-to-point communications mechanism to transmit focus messages to the spectacles, since this can allow the spectacles to incorporate a simpler receiver. Ideally each broadcast message from the target device includes sufficient information to allow the spectacle controller to determine that the message is addressed to it. In addition, since broadcast messages are inherently visible to other receivers nearby, it is advantageous to code each broadcast message so that it does not identify the recipient to potential eavesdroppers. This can be achieved by encrypting each message using a key associated with the recipient (either a secret key or a public key), and salting each message so that no two messages to the same recipient are ever alike.

In another embodiment of the present invention the eye tracking and focus control functions of the target device are embodied in a tracking device that is entirely separate from the target of user fixation. For example, the tracking device may be mounted on or adjacent to an arbitrary target object such as a display device, a wall, a printed poster, a desktop, etc., and may be configured with the shape and size of the target object's surface and the location of the tracking device's camera relative to the surface, so that it can accurately determine when the user is fixated on the target surface and control focus accordingly.

A target device used as a tracking device for itself, such as a smartphone, may also be used as a tracking device for another object.

FIG. 1 shows a block diagram of electroactive spectacles 2 responsive to a focus message 4 transmitted by an eye-tracking device 6 coupled to a display 8. The eye-tracking device 6 tracks the gaze of the eyes 10, 12 of the wearer of the spectacles as they fixate on the display 8. As described above, the tracking device 6 may be the same device as the target device that incorporates the display 8, or the display 8 may be separate from the tracking device. The tracking device incorporates a tracking camera 14 (or several cameras for improved field coverage and/or improved eye tracking accuracy), a tracking controller 18, and a transceiver (or transmitter) 20. The tracking camera 14 captures a stream of images 16 under control of tracking controller 18, and the tracking controller 18 analyses the images to detect the user's face (and eyes) and hence determine the user's gaze direction relative to the display 8, or the vergence of the user's eyes. The tracking controller 18 uses the transceiver to transmit focus messages 4 to the electroactive spectacles 2.

The electroactive spectacles 2 consist of a frame 22 housing a pair of electroactive lenses 24, 26. The spectacles 2 incorporate (or are coupled with) a transceiver (or receiver) 28 and a spectacles controller 30. The spectacles controller 30 uses the transceiver 28 to receive focus messages 4 from a tracking device 6, and is configured to set the focus of the electroactive lenses 24, 26 in accordance with the target focus contained in the received focus messages 4.

A focus message 4 may specify the target focus in a number of ways, including as a target focal length, a target focus mode (e.g. near or far), or a target control setting appropriate to the electroactive lenses (e.g. a voltage setting). The spectacles controller 30 translates the contents of the focus message 4 into an appropriate setting for the electroactive lenses.

Figure 2:
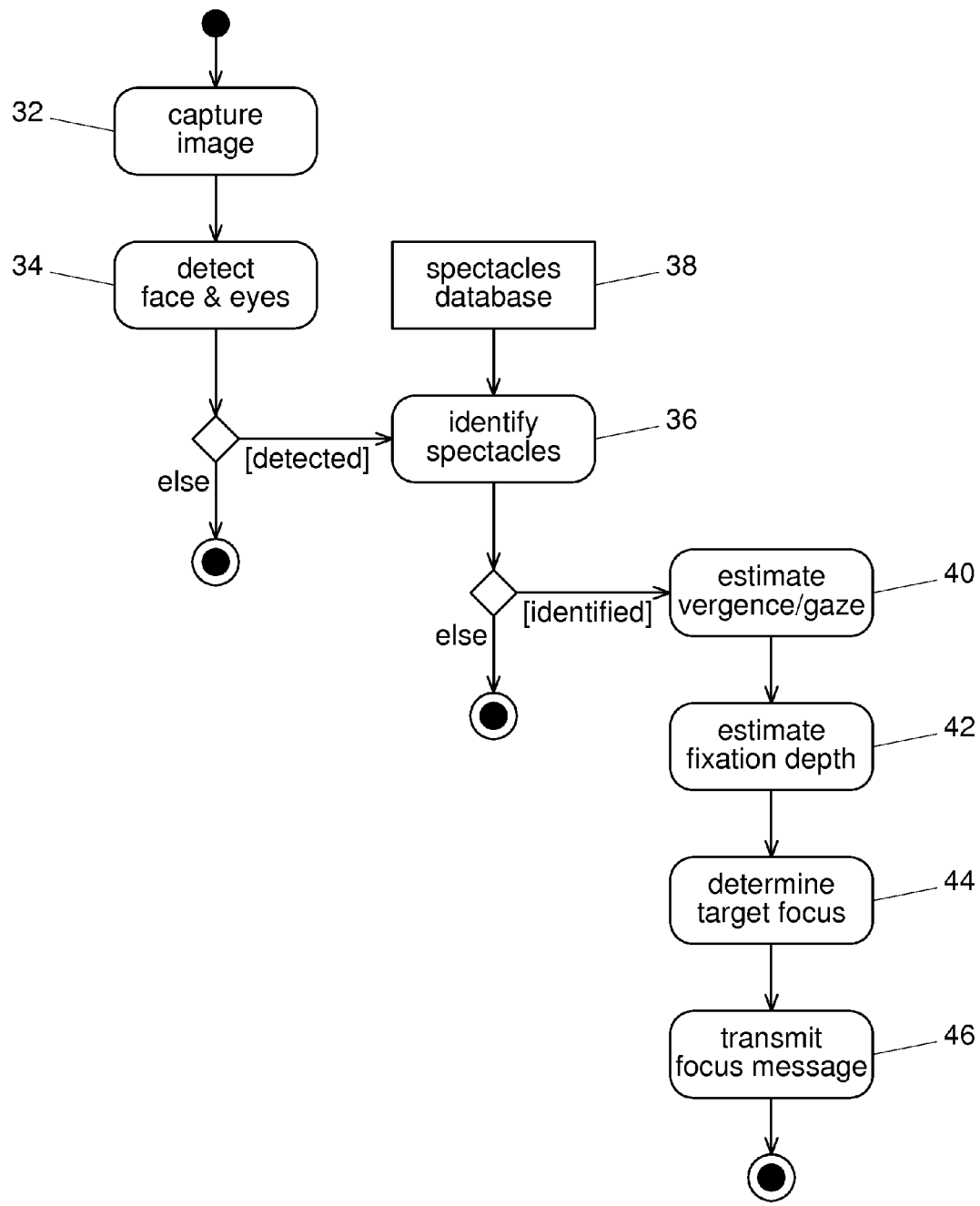
FIG. 2 shows an activity diagram of the operation of the eye-tracking device.

FIG. 2 shows an activity diagram of the operation of the eye-tracking device 6, as embodied in the logic of the tracking controller 18. The logic cycles continuously while eye tracking is active, e.g. at the frame rate of the tracking camera 14

(e.g. 30 Hz), or at least at a sufficiently high rate to provide a fast focus response time to the user (e.g. 5-10 Hz). Eye tracking is ideally active whenever the target device is active, and is therefore ideally handled by a resident background application or by an operating system process. Alternatively it may be provided as a function of a particular application or applications.

At the start of each cycle, the tracking controller 18 captures an image 16 (at 32) and attempts to detect a face and its eyes (at 34). If no face is detected then the cycle ends.

If a face is detected then the tracking controller 18 attempts to identify (at 36) the electroactive spectacles 2 associated with the face. As discussed above, identification may be based on first recognizing the face and then identifying spectacles associated with the owner of the face, or it may be based on recognizing the spectacles directly. Identification may also be implicit or assumed, such as when a single set of spectacles is associated with the target device. If the spectacles are not identified then the cycle ends.

If the spectacles are identified then the tracking controller 18 estimates the vergence or gaze direction of the eyes (at 40) and then estimates the fixation depth (at 42) of the fixation point of the gaze, or the fixation depth implied by the vergence of the two eyes. The tracking controller 18 finally determines, from the fixation depth, a target focus for the spectacles (at 44), and transmits a focus message 4 (at 46) to an address associated with the spectacles, indicating the target focus. The tracking controller 18 may determine the target focus directly from the vergence or gaze direction, i.e. without explicitly determining a fixation depth. For example, it may select a near focus setting whenever the user's vergence exceeds a particular threshold.

The step of identifying the spectacles (at 36) may rely on looking up the contents of a spectacles database 38, which contains the mapping from identifying data (such as face, user or barcode) to information such as a network address of the spectacles. The database 38 may be stored on the device, or in one or more network locations accessible to the device, or a mixture of the two.

Since it is equally important for the spectacles to revert to a far focus setting when the user fixates on a far object, the tracking controller 18 can be configured to transmit a stream of focus messages 4 while the user's fixation indicates the need for a near focus setting, and the spectacles controller 30 can be configured to revert to a default (e.g. far) focus setting whenever it fails to receive a timely focus message 4, i.e. after a short timeout.

Alternatively or additionally, when the user's fixation no longer indicates the need for a near focus setting, or the tracking controller loses sight of the user's face, the tracking controller can be configured to transmit a focus message 4 that indicates unknown focus (or far focus), and the spectacles controller can be configured to revert to a default (e.g. far) focus setting on receipt of such a message.

The tracking controller 18 may include a microprocessor for executing software that embodies the tracking logic described above, stored in a memory associated with the controller. Alternatively or additionally, some or all of the tracking logic may be embodied directly in the digital circuitry of the tracking controller 18.

The spectacles controller 30 may include a microprocessor for executing software that embodies the control logic that is responsive to focus messages 4, stored in a memory associated with the controller. Alternatively or additionally, some or all of the control logic may be embodied directly in the digital circuitry of the spectacles controller 30.

When the tracking device is incorporated in a target device such as a smartphone, the tracking controller 18 may be a component dedicated to the tracking function, or it may be a general-purpose microprocessor of the target device. Likewise the tracking camera may be a dedicated camera or a general-purpose camera of the target device, and the transceiver may be a dedicated transceiver (or transmitter) or a general-purpose transceiver of the device.

The invention claimed is:

1. A tracking device for controlling the focus of electroactive spectacles, said spectacles comprising at least one electroactive lens, said tracking device comprising:
   (a) a tracking camera;
   (b) a tracking controller;
   (c) a transmitter; and
   (d) a display device;
   wherein said tracking controller is configured to:
   (i) capture, via said tracking camera, an image;
   (ii) detect, in said image, a pair of eyes;
   (iii) determine, from the image of said eyes, a target focus; and
   (iv) transmit, via said transmitter and to said spectacles, a focus message;
   said focus message being indicative of said target focus, and instructive to said spectacles to set the focus of said at least one lens accordingly.

2. The tracking device of claim 1, wherein said controller is configured to estimate the vergence of said eyes, and to determine said target focus from said vergence.

3. The tracking device of claim 1, wherein said controller is configured to estimate the gaze direction of said eyes, and to determine said target focus from said gaze direction.

4. The tracking device of claim 3, wherein said controller is configured to estimate said gaze direction relative to said tracking camera.

5. The tracking device of claim 1, wherein said tracking device is at least one of: a mobile phone; a smartphone; a digital still camera; a digital video camera; an electronic book reader; a personal digital assistant; a handheld game machine; a tablet computer; a laptop computer; a desktop computer; a computer monitor; and a television.

6. The tracking device of claim 1, wherein said transmitter transmits said focus message to said spectacles directly.

7. The tracking device of claim 1, wherein said transmitter transmits said focus message to said spectacles via a network.

8. The tracking device of claim 7, wherein said network is selected from the group comprising: a personal-area network; a local-area network; a wide-area network; a wired network; a wireless network; and the Internet.

9. The tracking device of claim 1, wherein said controller is further configured to identify said spectacles and transmit said focus message to a network address associated with said spectacles.

10. The tracking device of claim 9, wherein said controller is configured to identify said spectacles by recognizing at least one feature of said spectacles.

11. The tracking device of claim 9, wherein said controller is configured to identify said spectacles by recognizing the face in the image containing said eyes and identifying said spectacles as associated with said face.

12. The tracking device of claim 9, wherein said controller is configured to identify said spectacles by identifying the spectacles as associated with at least one of: an owner of the tracking device; an habitual user of the tracking device; and a logged-in user of the tracking device.

13. The tracking device of claim 1, wherein said controller is further configured to only transmit said focus message if said spectacles are in the vicinity of said tracking device.

14. A method for controlling the focus of electroactive spectacles, said spectacles comprising at least one electroactive lens, said method comprising the steps of:
 (i) capturing, via a camera, an image;
 (ii) detecting, in said image, a pair of eyes;
 (iii) estimating, from the image of said eyes, a target focus;
 (iv) identifying said spectacles; and
 (v) transmitting, via a transmitter and to a network address associated with said spectacles, a focus message;
 said focus message being indicative of said target focus, and instructive to said spectacles to set the focus of said at least one lens accordingly.

15. The method of claim 14, further comprising a step of estimating the vergence of said eyes, and determining said target focus from said vergence.

16. The method of claim 14, further comprising a step of estimating the gaze direction of said eyes, and determining said target focus from said gaze direction.

17. A system comprising:
 (a) electroactive spectacles, said spectacles comprising at least one electroactive lens; and
 (b) the tracking device of claim 1 for controlling the focus of said spectacles;
 wherein said spectacles are configured to set the focus of said at least one lens according to said target focus indicated by said focus message transmitted by said tracking device.

18. The system of claim 17, wherein said spectacles further comprise:
 (a) a receiver; and
 (b) a spectacles controller;
 said spectacles controller configured to:
 (i) receive, via said receiver and from said tracking device, said focus message; and
 (ii) set the focus of said at least one lens according to said target focus indicated by said focus message.

19. The method of claim 14, wherein the step of identifying said spectacles comprises recognizing at least one feature of said spectacles.

20. The method of claim 14, wherein the step of identifying said spectacles comprises recognizing a face in said image containing said eyes and identifying said spectacles as associated with said face.

\* \* \* \* \*